United States Patent
Cheung

(10) Patent No.: US 7,413,076 B2
(45) Date of Patent: Aug. 19, 2008

(54) STORAGE CASE

(76) Inventor: Jason Kwok Cheung, 6 Copper Beeches, Stanway (GB)

( * ) Notice: Subject to any disclaimer, the term of this patent is extended or adjusted under 35 U.S.C. 154(b) by 548 days.

(21) Appl. No.: 10/496,202

(22) PCT Filed: Nov. 21, 2002

(86) PCT No.: PCT/GB02/05252

§ 371 (c)(1),
(2), (4) Date: May 20, 2004

(87) PCT Pub. No.: WO03/046917

PCT Pub. Date: Jun. 5, 2003

(65) Prior Publication Data

US 2005/0006259 A1    Jan. 13, 2005

(30) Foreign Application Priority Data

Nov. 21, 2001    (GB) .................................. 0127901.7

(51) Int. Cl.
*B65D 85/57* (2006.01)
(52) U.S. Cl. .................................... 206/312; 206/308.1
(58) Field of Classification Search ................ 206/312, 206/308.1, 307, 309, 313, 738, 739, 804, 206/761, 767, 768, 39, 39.4, 39.5, 39.6; 383/35, 383/43; 229/92.8; 312/9.11–9.38
See application file for complete search history.

(56) References Cited

U.S. PATENT DOCUMENTS

| 3,057,470 | A | * | 10/1962 | Old | 206/45.2 |
|---|---|---|---|---|---|
| 3,549,225 | A | * | 12/1970 | Scaccia | 312/9.9 |
| 3,774,757 | A | * | 11/1973 | Harris et al. | 206/313 |
| 4,739,877 | A | * | 4/1988 | Olson | 206/38.1 |
| 4,792,058 | A | * | 12/1988 | Parker | 221/232 |
| 4,852,727 | A | * | 8/1989 | Oberle | 206/39.4 |
| 4,947,984 | A | | 8/1990 | Kaufman et al. | |
| 5,125,505 | A | * | 6/1992 | Kurosaki | 206/39.4 |
| 5,165,534 | A | | 11/1992 | Kaufman et al. | |
| 5,472,281 | A | * | 12/1995 | Phelps | 383/43 |
| 5,479,732 | A | * | 1/1996 | Burtch et al. | 40/124.16 |
| 5,623,980 | A | * | 4/1997 | McMahon | 150/150 |
| 5,641,063 | A | * | 6/1997 | Gambardella et al. | 206/312 |
| 5,791,461 | A | * | 8/1998 | Tsuge | 206/39.4 |
| 6,102,568 | A | * | 8/2000 | Davis | 383/43 |
| 6,286,672 | B2 | * | 9/2001 | Dos Santos | 206/312 |

(Continued)

*Primary Examiner*—Mickey Yu
*Assistant Examiner*—Steven A. Reynolds
(74) *Attorney, Agent, or Firm*—Luedeka, Neely & Graham, P.C.

(57) ABSTRACT

A storage case for a generally planar item such as a compact disc. The case (10) has a pair of faces (12) adapted to distort when a compressive force is applied parallel to the plane of the disc (34). The case (10) also includes a retaining mechanism (14, 30) between the faces (12) that is adapted to hold the disc (34) in the case (10) when relaxed and adapted to urge the disc (34) out of the case (10) when the faces (12) are distorted by a force applied thereacross. Thus, the case (10) is easy to open and close and in the closed position protects the disc (34) from shock. Furthermore, a single action both opens the case (10) and offers the disc (34) out of the case for easy retrieval. The case (10) can also be adapted to clean the disc (34) as it is inserted into or withdrawn from the case.

16 Claims, 4 Drawing Sheets

U.S. PATENT DOCUMENTS 6,412,627 B1 * 7/2002 Tiscione et al. ............ 206/39.4
2001/0020593 A1 * 9/2001 Koehn ..................... 206/308.1
2003/0024835 A1 * 2/2003 Sherman ..................... 206/312

* cited by examiner

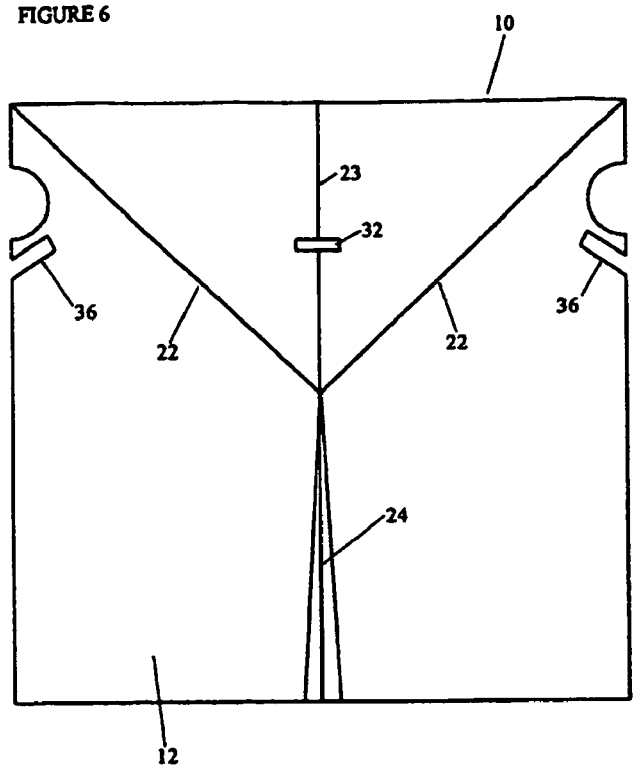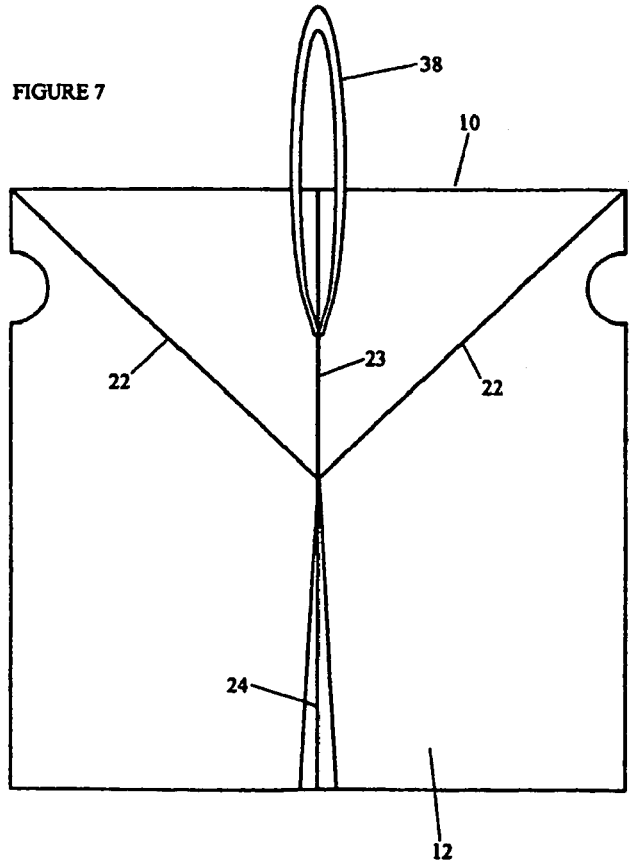

STORAGE CASE

The present invention relates to a storage case for a generally planar item such as a compact disc (CD), which helps to prolong the life of the disc by storing it in a protective outer casing which withstands a certain degree of shock, whilst still being easy to open and close.

Existing storage cases, such as the hinged plastic cases in which CDs are most often sold, only perform the function of storing the disc and are very fragile; although they may protect the disc, in the process they frequently crack and shatter easily. In addition, they are difficult to open and it can be difficult to remove the disc from the case, with most cases requiring a certain acquired technique. It is often necessary to use two hands to open the case and access the disc and then insert it into a player or computer.

Accordingly, the present invention provides a storage case for a generally planar item, which comprises a pair of faces adapted for controlled distortion when a compressive force is applied parallel to the plane of the item, and retaining means between the faces adapted to hold the item when relaxed and adapted to urge the item from the case when the faces are distorted by a force applied thereacross. This one simple action both opens the case and offers the item out of the case for easy removal.

Preferably, the retaining means comprises side walls between the faces to create a cavity therebetween for receiving a generally planar item, each side wall having an arcuate surface defining part of the boundary of the cavity.

Furthermore, the retaining means preferably also comprises a resilient member between the faces operable to urge the item out of the case when the faces are distorted.

In a preferred embodiment, the case is arranged such that distortion of the faces places the resilient member in tension.

Conveniently, the resilient member comprises an elastic cord secured to the faces and engageable against an edge of an item placed in the cavity.

Each face is preferably formed with crease lines to allow controlled distortion of the face in response to the compressive force.

The crease lines may define a pair of triangular panels which project outwardly from the plane of the item in response to the compressive force.

Additionally, each face may be formed with a cut which opens in response to the compressive force.

Advantageously, the case is provided with opposed recesses to facilitate application of the compressive force at an optimum location.

The case may also comprise means to facilitate hanging of the case for storage. This means may be slots formed in the case, allowing it to be hung over a cord or wire, or a loop of material on the exterior of the case to be hung over a hook or such like.

Preferably, the case further comprises means to wipe the surface of the planar item upon insertion into or withdrawal from the case thereby to clean the item.

In particular, the cavity may be lined with a cleaning material which acts to clean the item as it is moved into or out of the case.

The faces of the case may be formed from material such as card or plastic, to provide both flexibility and a degree of shock protection.

The invention will now be described in detail, by way of example only, with reference to the accompanying drawings in which:

FIG. 6 is a plan view of a second embodiment of the invention; and

FIG. 7 is a plan view of a third embodiment of the present invention.

Figure 1:
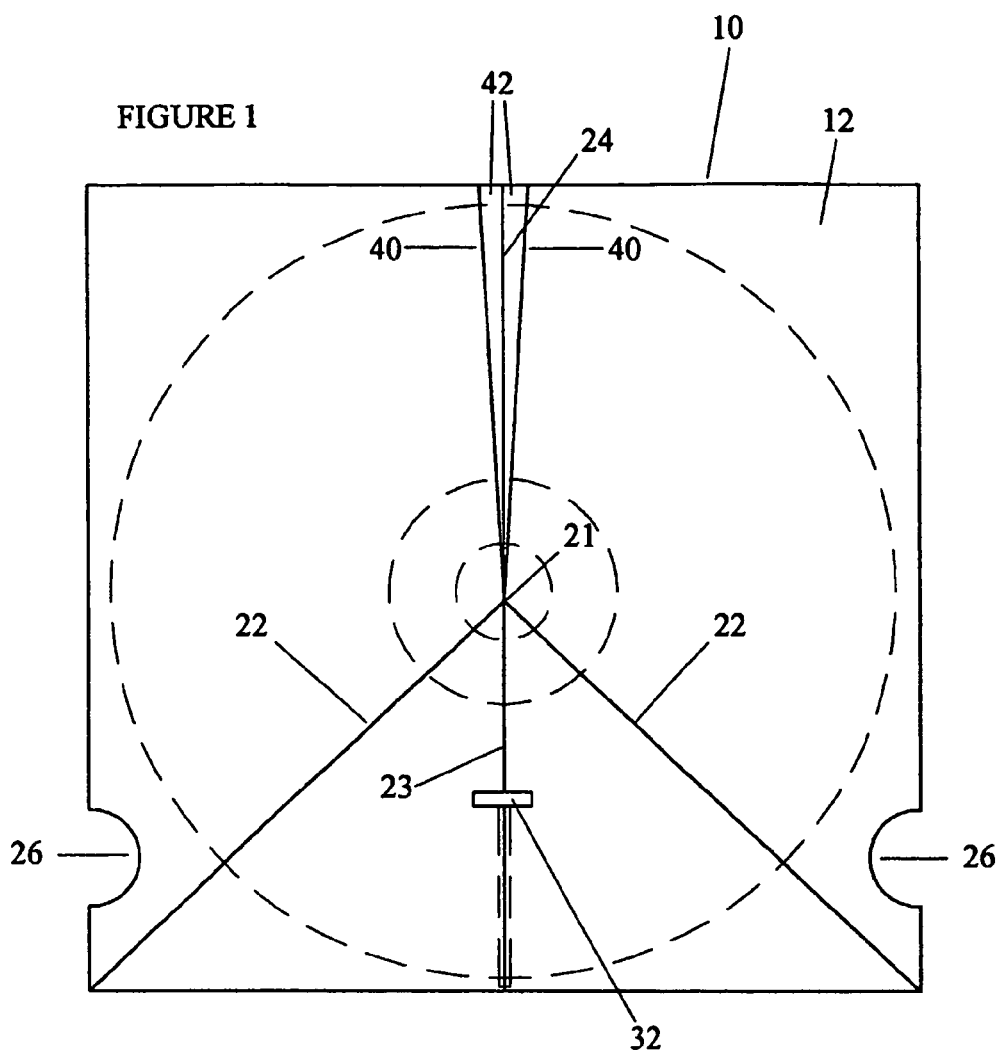
FIG. 1 is a plan view of a first embodiment of a storage case in accordance with the present invention, in the closed condition.
Figure 2:
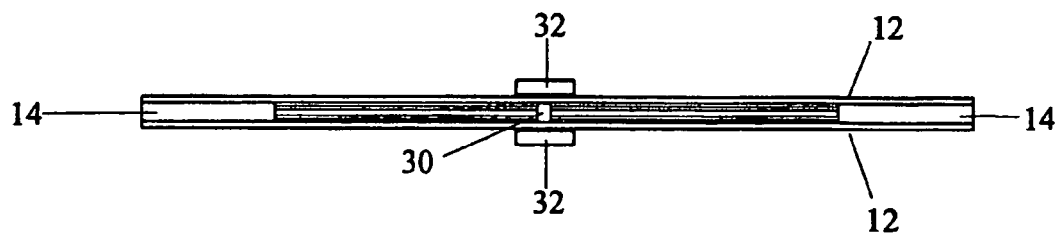
FIG. 2 is an end view of the case of FIG. 1.

With reference to FIGS. 1 and 2, the case 10 of the present invention comprises two generally planar faces 12. For ease of reference, the face 12 visible in FIG. 1 and on the top in FIG. 2 will be referred to as the front face, and the lower face in FIG. 2 will be referred to as the rear face, but it will be appreciated that this denomination is purely arbitrary and both faces 12 are identical.

Figure 5:
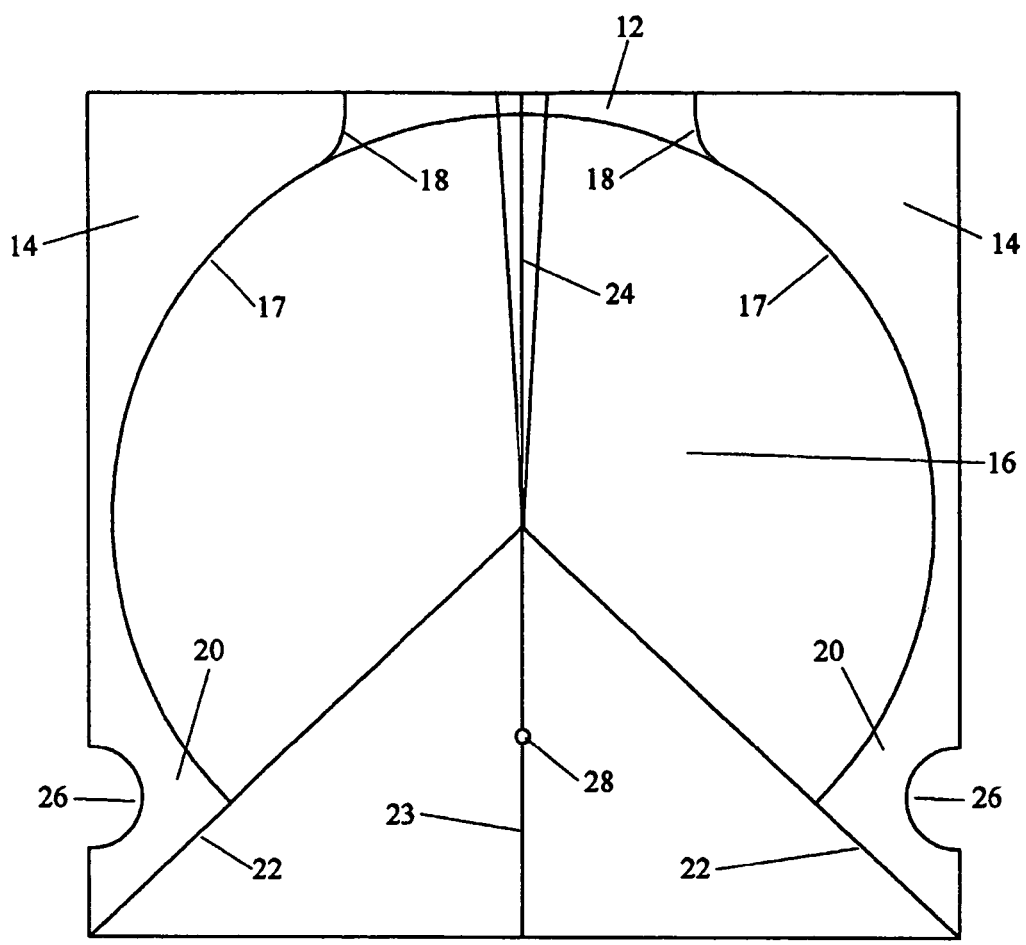
FIG. 5 is a plan view of the case of FIG. 1, with top face removed.

The faces 12 are joined by side members 14 best seen in FIG. 5. The side members 14 each comprise a block of material secured between the front and rear faces 12 and which are shaped to create a cavity 16 between the front and rear faces 12. The cavity 16 is shaped and dimensioned to receive a planar item with a close fit. In this case the cavity 16 is substantially circular to receive an item such as a CD and is defined in part by arcuate inner edges 17 of the side walls 14. In the closed condition of the case 10, shoulders 18, 20 of the side members 14 ensure that the CD is retained within the cavity 16.

The case 10 is substantially square with a centre point 21. With reference to the orientation of the case 10 shown in FIGS. 1 and 5, each face 12 is formed with a crease line 22 extending from each lower corner to the centre point 21. A third crease line 23 extends from the centre point downwardly to the midpoint of the lowermost edge of the case 10. A cut 24 through each face 12 extends upwardly from the centre point 21 to the midpoint of the uppermost edge of the case 10. A curved recess 26 is formed in each side of the case 10 towards the lowermost edge but above the crease lines 22.

Each face 12 is provided with a small hole 28 located on the crease line 23 approximately half way between the centre point 21 and the lowermost edge of the case 20. This is best seen in FIG. 5. An elastic cord 30 is provided within the case 10 between the two faces 12. Each end of the cord 30 passes out the case 10 through the hole 28 and is secured on the exterior of the case 10, for example by a knot or by fixture to an end piece 32 which is too large to pass through the hole 28. In use, when a disc 34 is located in the cavity 16, the elastic cord 30 is stretched down around the lowermost edge of the disc 34, as shown in dotted lines in FIG. 1.

Figure 3:
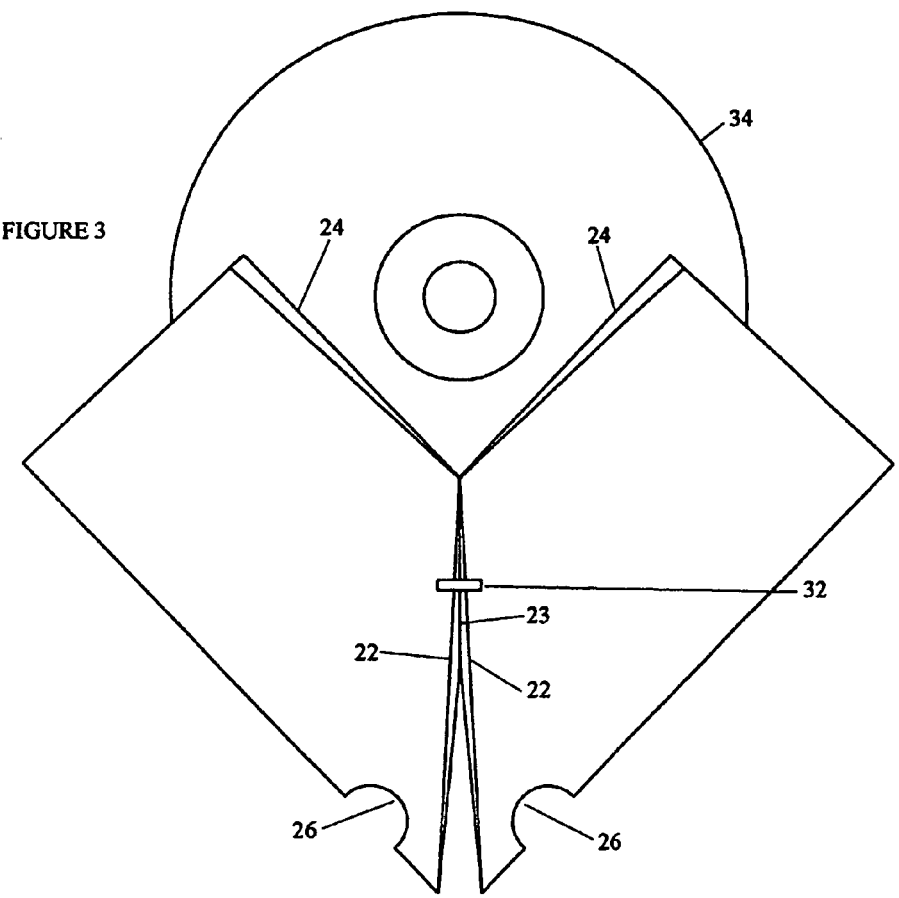
FIG. 3 is a plan view of the case of FIG. 1 in the open condition.
Figure 4:
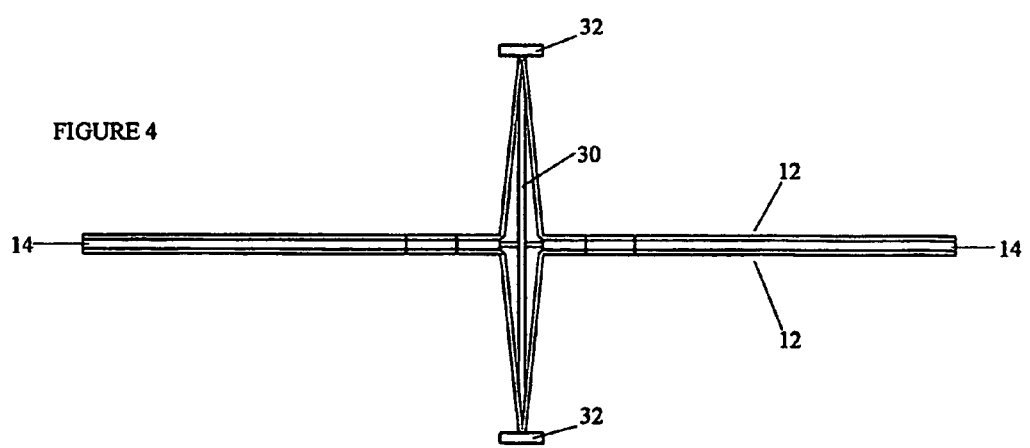
FIG. 4 is an end view of the case of FIG. 3.

In use, a user places a thumb in one recess 26 and a finger in the opposite recess 26 and squeezes them together. This compressive force applied parallel to the plane of each face 12 causes the front and rear faces 12 to bend along crease lines 22, 23 so that the triangular panels formed between the crease lines 22, 23 and the lower edge of the case 10 project outwardly as best seen in FIG. 4. Simultaneously, each face 12 separates at cut 24 as best seen in FIG. 3. As this happens, the elastic cord 30 becomes tensioned and pushes against the lowermost edge of the disc 34, forcing it upwardly and out of the case 10 as seen in FIG. 3. Thus, one action both opens the case 10 and releases the disc 34, offering it out of the case 10 for easy removal.

If the user ceases to apply the compressive force by removing their finger and thumb from the recesses 26, the cord 30 retracts, pulling the triangular panels back in the planar configuration and closing the cut 24 to return the case 10 to the closed condition of FIG. 1.

When it is desired to insert a disc 34 into an empty case 10, once again the case 10 is opened by squeezing the opposing recesses 26. The disc 34 is inserted into the cavity 16 until its lowermost edge pushes against the elastic cord 30. Continued pressure against the cord 30 causes it to pull the triangular sections of the faces 12 inwardly, to restore the faces 12 to the planar configuration. Simultaneously, each cut 24 closes up and the disc 34 is thus retained within the case 10.

It will be appreciated that the recesses 26 assist the user in applying the compressive force at an optimum location to open the case 10 most efficiently, and for ergonomic considerations, but are not essential.

Further crease lines 40 may provide either side of cut 24 to provide lips 42 which can project slightly out of the plane of the respective face 12, to facilitate inserting a disc 34 into the case 12.

The case 10 may be made from card or plastic material such as polypropylene, which is sufficiently pliable to form the crease lines 22, 23 which act as living hinges which can withstand repeated bending. If a plastic material is used to form the case 10, part or all of the faces 12 may be transparent or translucent so that the presence or absence of a disc 34 in the cavity 16 is clearly visible. The softer type of materials which can be used to make the case 10 of the present invention, as compared with conventional CD cases, provide greater shock protection for the item inside.

The cavity 16 may be lined with a disc cleaning material so the action of inserting a disc 34 into the cavity 16 or pushing it out of the cavity 16 wipes the surface of the disc to clean it.

To allow for storage of the case 10 itself, it may be provided with slots 36 as seen in FIG. 6 to enable it to be slotted over wires or cords. Alternatively, a loop of material 38 may be provided on the exterior of the case 10 as shown in FIG. 7 enabling the case 10 to be hung up for storage.

It will be appreciated that the present invention provides an improved storage case for planar items such as compact discs, which provides increased shock protection combined with easy opening and closing. It will also be appreciated that a number of variations and modifications to the precise details described could be made without departing from the scope of the invention as defined by the claims.

The invention claimed is:

1. A storage case for a generally planar item having two substantially parallel flat sides, the storage case comprising a pair of faces adapted for controlled distortion when a compressive force is applied parallel to the two parallel flat sides of the item, retaining means between the faces adapted to hold the item when relaxed and adapted to urge the item from the case such that at least a portion of each of the two parallel flat sides is exposed beyond any portion of the storage case when the faces are distorted by the compressive force, and opposed recesses in the case to facilitate application of the compressive force at an optimum location.

2. A storage case as claimed in claim 1, wherein the retaining means comprises side walls between the faces to create a cavity therebetween for receiving the item, each side wall having an arcuate surface defining part of the boundary of the cavity.

3. A storage case as claimed in claim 2, wherein the retaining means further comprises a resilient member between the faces operable to urge the item out of the case when the faces are distorted.

4. A storage case as claimed in claim 3, arranged such that distortion of the faces places the resilient member in tension.

5. A storage case as claimed in claim 3, wherein the resilient member comprises an elastic cord secured to the faces and engageable against an edge of an item placed in the cavity.

6. A storage case as claimed in claim 4, wherein the resilient member comprises an elastic cord secured to the faces and engageable against an edge of an item placed in the cavity.

7. A storage case as claimed in claim 1, wherein each face is formed with crease lines to allow controlled distortion of the face in response to the compressive force.

8. A storage case as claimed in claim 7, wherein the crease lines define a pair of triangular panels which project outwardly from the plane of the item in response to the compressive force.

9. A storage case as claimed in claim 1, wherein each face is formed with a cut which opens in response to the compressive force.

10. A storage case as claimed in claim 1, further comprising means to allow the case to be hung for storage.

11. A storage case as claimed in claim 10, wherein the means comprises slots formed in the case.

12. A storage case as claimed in claim 10, wherein the means comprises a loop of material on the exterior of the case.

13. A storage case as claimed in claim 1, further comprising means to wipe the surface of the planar item upon insertion into or withdrawal from the cavity to thereby clean the item.

14. A storage case as claimed in claim 13, wherein the cavity is lined with a material which acts to clean the item as it is moved into or out of the case.

15. A storage case as claimed in claim 1, wherein the faces are formed from card.

16. A storage case as claimed in claim 1, wherein the faces are formed from plastic.

\* \* \* \* \*